(12) United States Patent
Thota et al.

(10) Patent No.: US 11,285,900 B1
(45) Date of Patent: Mar. 29, 2022

(54) AIRBAG HOUSING

(71) Applicant: Ford Global Technologies, LLC, Dearborn, MI (US)

(72) Inventors: Bhavani Thota, Novi, MI (US); Chuck R. Reese, Northville, MI (US); Angela Zaetta, Canton, MI (US); Eric Axel Smitterberg, Berkley, MI (US); Linh Ngoc Doan, Belleville, MI (US); Murali Maddali, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/076,863

(22) Filed: Oct. 22, 2020

(51) Int. Cl.
*B60R 21/20* (2011.01)

(52) U.S. Cl.
CPC ................... *B60R 21/20* (2013.01)

(58) Field of Classification Search
CPC ..... B60R 21/20; B60R 21/203; B60R 21/207; B60R 21/205; B60R 21/215; B60R 21/201
See application file for complete search history.

(56) References Cited

U.S. PATENT DOCUMENTS

| | | | | |
|---|---|---|---|---|
| 5,403,033 A | * | 4/1995 | Koma | B60R 21/20 280/728.2 |
| 5,480,182 A | | 1/1996 | Lauritzen et al. | |
| 5,588,675 A | * | 12/1996 | Lotspih | B60R 21/2171 280/732 |
| 6,199,896 B1 | * | 3/2001 | Brucker | B60R 21/20 280/728.2 |
| 6,354,621 B1 | * | 3/2002 | Zimmerbeutel | B60R 21/2171 280/728.2 |
| 8,544,875 B2 | | 10/2013 | Heinisch et al. | |
| 9,517,745 B1 | | 12/2016 | Keyser et al. | |
| 2009/0001700 A1 | * | 1/2009 | Sahm | B60R 21/217 280/743.1 |
| 2009/0039623 A1 | * | 2/2009 | Kawabe | B60R 21/207 280/728.3 |
| 2015/0151705 A1 | * | 6/2015 | Sugawara | B29C 66/532 280/728.3 |
| 2018/0312129 A1 | * | 11/2018 | An | B60R 21/217 |

FOREIGN PATENT DOCUMENTS

| | | | | |
|---|---|---|---|---|
| DE | 2035742 A1 | * | 1/1972 | ............. B60R 21/20 |
| DE | 10216349 C1 | * | 11/2003 | ......... B60R 21/2171 |
| DE | 102017222950 A1 | * | 6/2019 | |
| EP | 1273489 A2 | * | 1/2003 | ......... B60R 21/2171 |

(Continued)

OTHER PUBLICATIONS

Machine Translation of DE10216349 (Year: 2003).*

*Primary Examiner* — Paul N Dickson
*Assistant Examiner* — Kurtis Nielson
(74) *Attorney, Agent, or Firm* — Frank A. MacKenzie; Bejin Bieneman PLC

(57) ABSTRACT

An airbag assembly includes a housing having a base, a first wall, a second wall, and a pair of end walls defining a cavity. The first wall and the second wall are spaced from each other, each of the first wall and the second wall extending from the base to a distal edge. The pair of end walls are spaced from each other and extending from the first wall to the second wall. The distal edge of the first wall extends from the end walls toward the second wall. The airbag assembly includes an airbag disposed in the cavity.

15 Claims, 5 Drawing Sheets

(56) References Cited

FOREIGN PATENT DOCUMENTS

| | | | | |
|---|---|---|---|---|
| EP | 2495135 A1 | * | 9/2012 | ......... B60R 21/2171 |
| GB | 2281259 A | * | 3/1995 | ......... B60R 21/2176 |
| GB | 2522751 A | * | 8/2015 | ......... B29C 65/7841 |
| JP | 2018070019 A | * | 5/2018 | |
| KR | 20000038326 A | * | 7/2000 | |
| KR | 100522870 B1 | * | 10/2005 | ........... B60R 21/217 |
| KR | 20090011521 A | * | 2/2009 | |
| KR | 20090051999 A | | 5/2009 | |
| WO | WO-02051673 A1 | * | 7/2002 | ......... B60R 21/2644 |
| WO | WO-2015146361 A1 | * | 10/2015 | ........... B60R 21/213 |
| WO | WO-2016010011 A1 | * | 1/2016 | ........... B60R 21/207 |
| WO | WO-2017133365 A1 | * | 8/2017 | ............. B60R 21/20 |
| WO | 2018026175 A1 | | 2/2018 | |

* cited by examiner

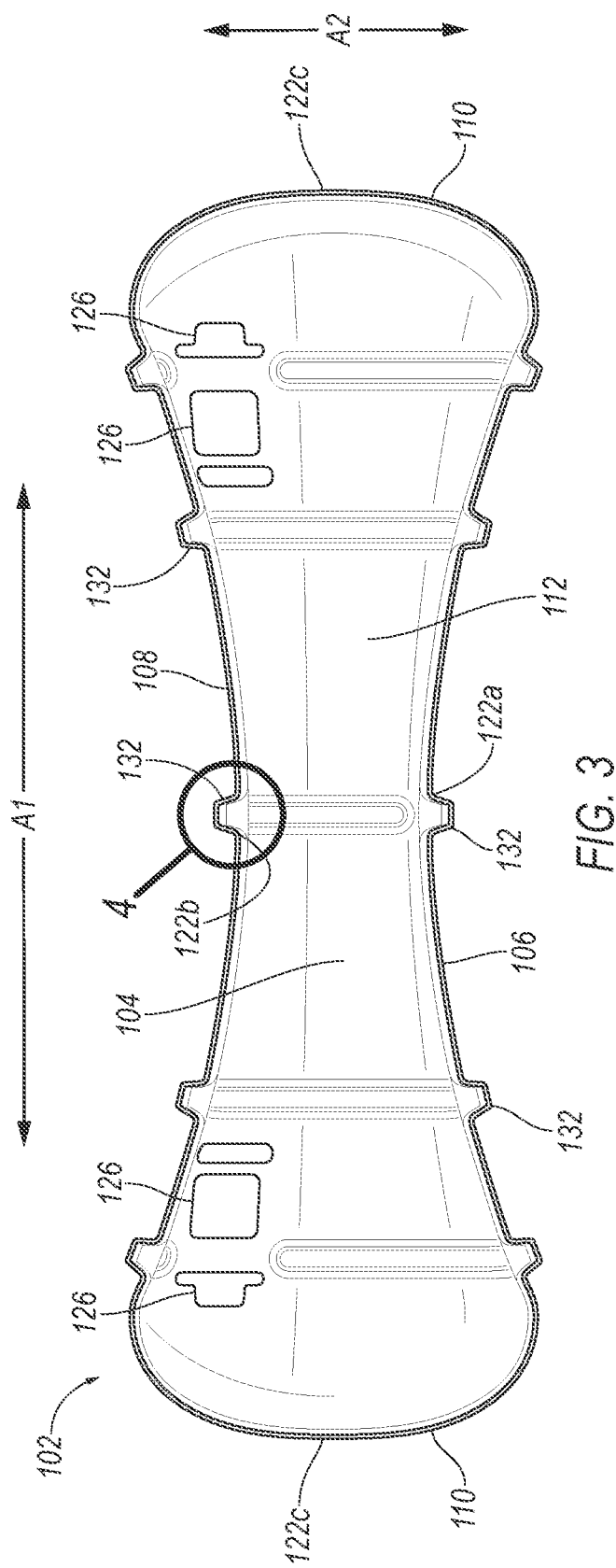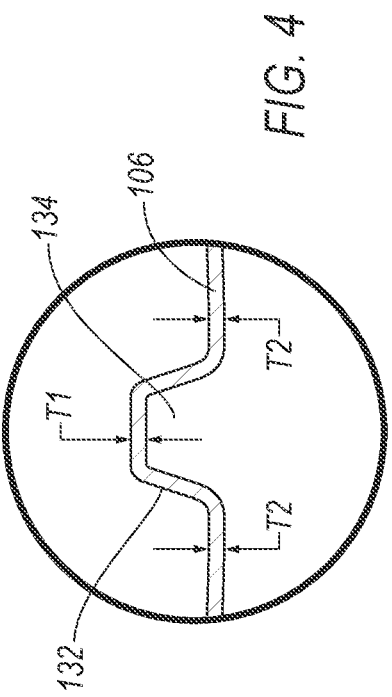

AIRBAG HOUSING

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

BRIEF DESCRIPTION OF THE DRAWINGS

FIG. 3 is a top-sectional view of the housing.
FIG. 4 is an enlargement of a portion of the housing shown in FIG. 3.

DETAILED DESCRIPTION

An airbag assembly includes a housing having a base, a first wall, a second wall, and a pair of end walls defining a cavity. The first wall and the second wall are spaced from each other, and each of the first wall and the second wall extend from the base to a distal edge. The pair of end walls are spaced from each other and extend from the first wall to the second wall. The distal edge of the first wall extends from the end walls toward the second wall. The airbag assembly includes an airbag disposed in the cavity.

The first wall at the base may extend toward the second wall from the end walls.

The distal edge of the second wall may extend from the end walls toward the first wall.

The first wall may be concave toward the cavity.

The second wall may be concave toward the cavity.

The first wall may define an apex.

The apex may be centered between the end walls.

The first wall may include a support rib extending from the base to the distal edge of the first wall at the apex.

The first wall may include a support rib, and a thickness of the first wall at the support rib may be the same as a thickness of the first wall adjacent the support rib.

The first wall may define an opening between the base and the distal edge of the first wall.

The first wall may include a support rib extending from the base to the opening and from the opening to the distal edge of the first wall.

The end walls may extend from the base to distal edges, and the distal edges of the end walls may extend away from each other at the first wall and the second wall.

The end walls may be convex away from the cavity.

The end walls may each define an apex centered between the first wall and the second wall.

A distance from the first wall to the second wall may be less at a center between the end walls than a distance from the first wall to the second wall at the end walls.

A distance between the end walls may be greater at a center between the first wall and the second wall than a distance between the end walls at the first wall and the second wall.

The cavity may have an open top at the distal edges, and the airbag in an inflated position may extend out of the cavity through the open top.

Figure 1:
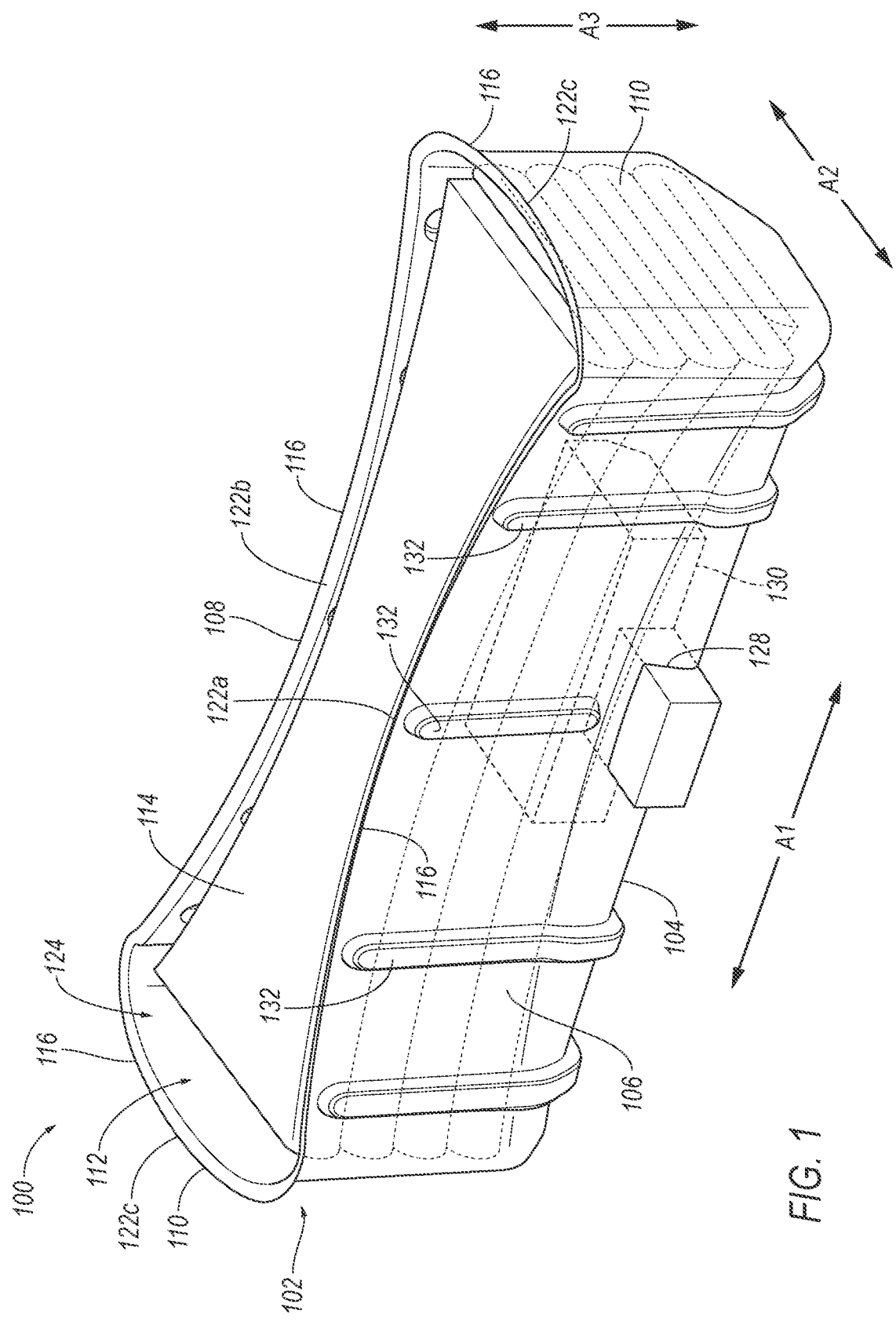
FIG. 1 is a perspective view of an airbag assembly.
Figure 2:
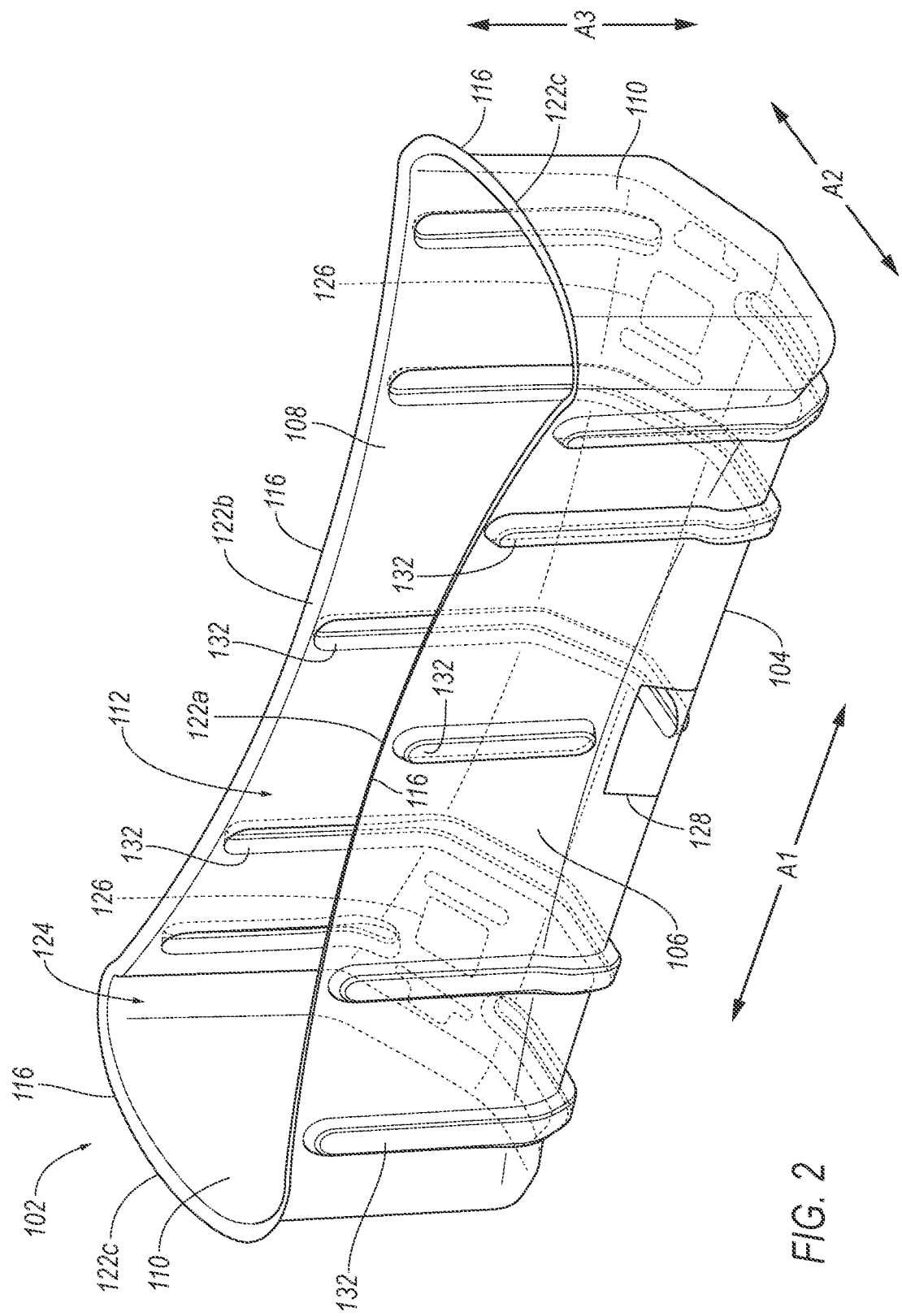
FIG. 2 is a perspective view of a housing of the airbag assembly.

With reference to FIG. 1, wherein like numerals indicate like parts throughout the several views, an airbag assembly 100 for a vehicle includes a housing 102 having a base 104, a first wall 106, a second wall 108, and a pair of end walls 110 defining a cavity 112. The airbag assembly 100 includes an airbag 114 disposed in the cavity 112. The first wall 106 and the second wall 108 are spaced from each other. Each of the first wall 106, the second wall 108, and the end walls 110 extend from the base 104 to a distal edge 116. The pair of end walls 110 are spaced from each other and extend from the first wall 106 to the second wall 108. The distal edge 116 of the first wall 106 extends from the end walls 110 toward the second wall 108.

The housing 102 provides increased stiffness and reduced manufacturing complexity and cost. The increased stiffness reduces flex of the housing 102 and decreases variation in movement of the airbag 114 when the airbag 114 deploys from an uninflated position, shown in FIGS. 1 and 5, to an inflated position, shown in FIG. 6. For example, during deployment of the airbag 114 the first wall 106 and the second wall 108 may have a reduced amount of outward movement, thereby maintaining a more consistent (i.e., less dynamic) shape to an open top 124 of the housing 102 during deployment. The reduced amount of outward movement may be provided by the distal edge 116 of the first wall 106 extending from the end walls 110 toward the second wall 108, e.g., transferring force from the deploying airbag 114 to the first wall 106 such that at least a portion of the force is applied as compression along the first wall 106 to the end walls 110.

The vehicle (not shown) may be any suitable type of automobile, e.g., a passenger or commercial automobile such as a sedan, a coupe, a truck, a sport utility vehicle, a crossover vehicle, a van, a minivan, a taxi, a bus, etc. The vehicle, for example, may be an autonomous vehicle. In other words, the vehicle may be autonomously operated such that the vehicle may be driven without constant attention from a driver, i.e., the vehicle may be self-driving without human input.

The housing 102 packages the airbag 114 in the uninflated position. The housing 102 may provide a reaction surface for the airbag 114 in the inflated position. The housing 102 may be formed of any material, e.g., a rigid polymer, a metal, a composite, etc. The housing 102 may be fixed to any suitable structure of the vehicle, such as an instrument panel, steering wheel, pillar, seat, roof, floor, etc.

With reference to FIGS. 2-5, the base 104 may extend along a longitudinal axis A1 and a lateral axis A2 perpendicular to the longitudinal axis A1. The base 104 may be elongated along the longitudinal axis A1. In other words, a length of the base 104 along the longitudinal axis A1 may be greater than a width of the base 104 along the lateral axis A2. The width of the base 104 may be thinnest midway along the lateral axis A2. For example, the base 104 may be hourglass shaped.

The first wall 106 and the second wall 108 each extend from the base 104 to their respective distal edge 116, e.g., along a vertical axis A3 that is perpendicular to the longitudinal axis A1 and the lateral axis A2. The first wall 106 and the second wall 108 may generally extend along the longitudinal axis A1 from one end wall 110 to the other end wall 110. The first wall 106 and the second wall 108 may be elongated along the longitudinal axis A1. The first wall 106 and the second wall 108 are spaced from each other, e.g., along the lateral axis A2.

The first wall 106 at the base 104 and the distal edge 116 may extending from the end walls 110 toward the second wall 108, e.g., along the lateral axis A2. In other words, the first wall 106 may extend transversely from the walls toward the second wall 108 both along the longitudinal axis A1 and the lateral axis A2. The second wall 108 at the base 104 and the distal edge 116 may extend from the end walls 110 toward the first wall 106, e.g., along the lateral axis A2. A distance from the first wall 106 to the second wall 108 along the lateral axis A2 is less at a center between the end walls 110 than at a distance from the first wall 106 to the second wall 108 along the lateral axis A2 at the end walls 110. In other words, the width of the housing 102 defined by the first wall 106 and the second wall 108 may be narrower at the center between the end walls 110 than at the end walls 110.

The first wall 106, including the distal edge 116 of the first wall 106, may arcuately extend from one of the end walls 110 to the other of the end walls 110 and define an apex 122a there between. The apex 122a of the first wall 106 may be closer to the second wall 108 along the lateral axis A2 than a remainder of the first wall 106. The apex 122a may be centered between the end walls 110. In other words, a distance from the apex 122a of the first wall 106 to one of the end walls 110 may be generally the same as a distance from the apex 122a to the other of the end walls 110. The second wall 108, including the distal edge 116 of the second wall 108, may arcuately extend from one of the end walls 110 to the other of the end walls 110 and define another apex 122b there between. In other words, the first wall 106 may be concave toward the cavity 112 and the second wall 108 may be concave toward the cavity 112, e.g., collectively having a generally hourglass shape.

The end walls 110 each extend from the base 104 to their respective distal edge 116, e.g., along the vertical axis A3. The end walls 110 may generally extend along the lateral axis A2 from the first wall 106 to the second wall 108. The end walls 110 are spaced from each other, e.g., along the longitudinal axis A1.

The end walls 110 at the base 104 and the respective distal edge 116 may extend away from each other at the first wall 106 and the second wall 108, e.g., along the longitudinal axis A1. In other words, the end walls 110 may extend transversely from the first wall 106 and the second wall 108 away from each other both along the longitudinal axis A1 and the lateral axis A2.

A distance between the end walls 110 along the longitudinal axis A1 is greater at a center between the first wall 106 and the second wall 108 than a distance between the end walls 110 at the first wall 106 and the second wall 108 along the longitudinal axis A1. In other words, the length of the housing 102 defined by the end walls 110 may be greater at the center between the first wall 106 and the second wall 108 than at the first wall 106 and the second wall 108.

The end walls 110, including the respective distal edges of the first wall 106, may arcuately extend from the first wall 106 to the second wall 108, defining a respective apex 122c there between. The apex 122c of each of the end walls 110 may be farther from the other of the end walls 110 along the longitudinal axis A1 than a remainder of such end wall 110. The apex 122c may be centered between the first wall 106 and the second wall 108. In other words, a distance from the apex 122c of one of the end walls 110 to the first wall 106 may be generally the same as a distance from the apex 122c to the second wall 108. In other words, e.g., the end walls 110 may be convex away from the cavity 112.

The base 104, the first wall 106, the second wall 108, and the end walls 110 may be unitary, i.e., a single, uniform piece of material with no seams, joints, fasteners, or adhesives holding it together. Specifically, the base 104, the first wall 106, the second wall 108, and the end walls 110 are formed together simultaneously as a single continuous unit, e.g., by machining from a unitary blank, molding, forging, casting, stamping, etc. Non-unitary components, in contrast, are formed separately and subsequently assembled, e.g., by threaded engagement, welding, etc.

The base 104, the first wall 106, the second wall 108, and the end walls 110 define the cavity 112. For example, the cavity 112 may be between the first wall 106 and the second wall 108 along the lateral axis A2, and between the end walls 110 along the longitudinal axis A1. The base 104 may define a bottom of the cavity 112. The cavity 112 may include the open top 124, e.g., at the distal edges 116. In other words, the distal edge 116 of the first wall 106, the distal edge 116 of the second wall 108, and distal edges of the end walls 110 may surround the open top 124, e.g., along the longitudinal axis A1 and the lateral axis A2. The open top 124 may be opposite the base 104 relative to the cavity 112 along the vertical axis A3.

The housing 102 may define one or more openings 126, 128, e.g., the base 104 may define openings 126 and the first wall 106 may defines an opening 128 between the base 104 and the distal edge 116 of the first wall 106. The openings 126 may receive a fastener, or other structure, that fixes the housing 102 to another component of the vehicle. The opening 128 of the first wall 106 enables connection of an inflator 130 of the airbag assembly 100 to a communication network of the vehicle. For example, the inflator 130 may be in the cavity 112 of the housing 102 and a wiring harness of the communication network may couple to the inflator 130 through the opening 128 of the first wall 106.

The housing 102 may include a plurality of support ribs 132. The support ribs 132 increase strength and stiffness of the housing 102. The support ribs 132 may extend outward, i.e., away from the cavity 112. The support ribs 132 may partially surround the cavity 112, e.g., extending along the vertical axis A3 along the first wall 106 and the second wall 108 and along the lateral axis A2 along the base 104 therebetween. The support ribs 132 may be elongated along the lateral axis A2 and/or the vertical axis A3. The support ribs 132 may be spaced from each other along the longitudinal axis A1, i.e., not touching each other and with no transverse connecting ribs extending therebetween. The support ribs 132 may be parallel with each other. The support ribs 132 may each define a plane, the planes parallel with each other. The support ribs 132 may extend from the base 104 to the distal edges 116 of the first wall 106 and the second wall 108. One of the support ribs 132 may be at the apex 122a of the first wall 106 and the apex 122b of the second wall 108. One of the support ribs 132 may extend from the base 104 to the opening 128 of the first wall 106 and from the opening 128 to the distal edge 116 of first wall 106. In other words, the opening 128 of the first wall 106 may bisect one or more of the support ribs 132.

With reference to FIG. 4, a thickness T1 of the first wall 106 at the support rib 132 may be the same as a thickness T2 of the first wall 106 adjacent the support rib 132. In other words, the thickness T1, T2 of the first wall 106 between an inner surface facing the cavity 112 and an outer surface facing away from the cavity 112 may be generally uniform.

For example, each support rib 132 may define a groove 134 at the inner surface and directly opposite the extension of the respective rib 132.

The airbag 114 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 5:
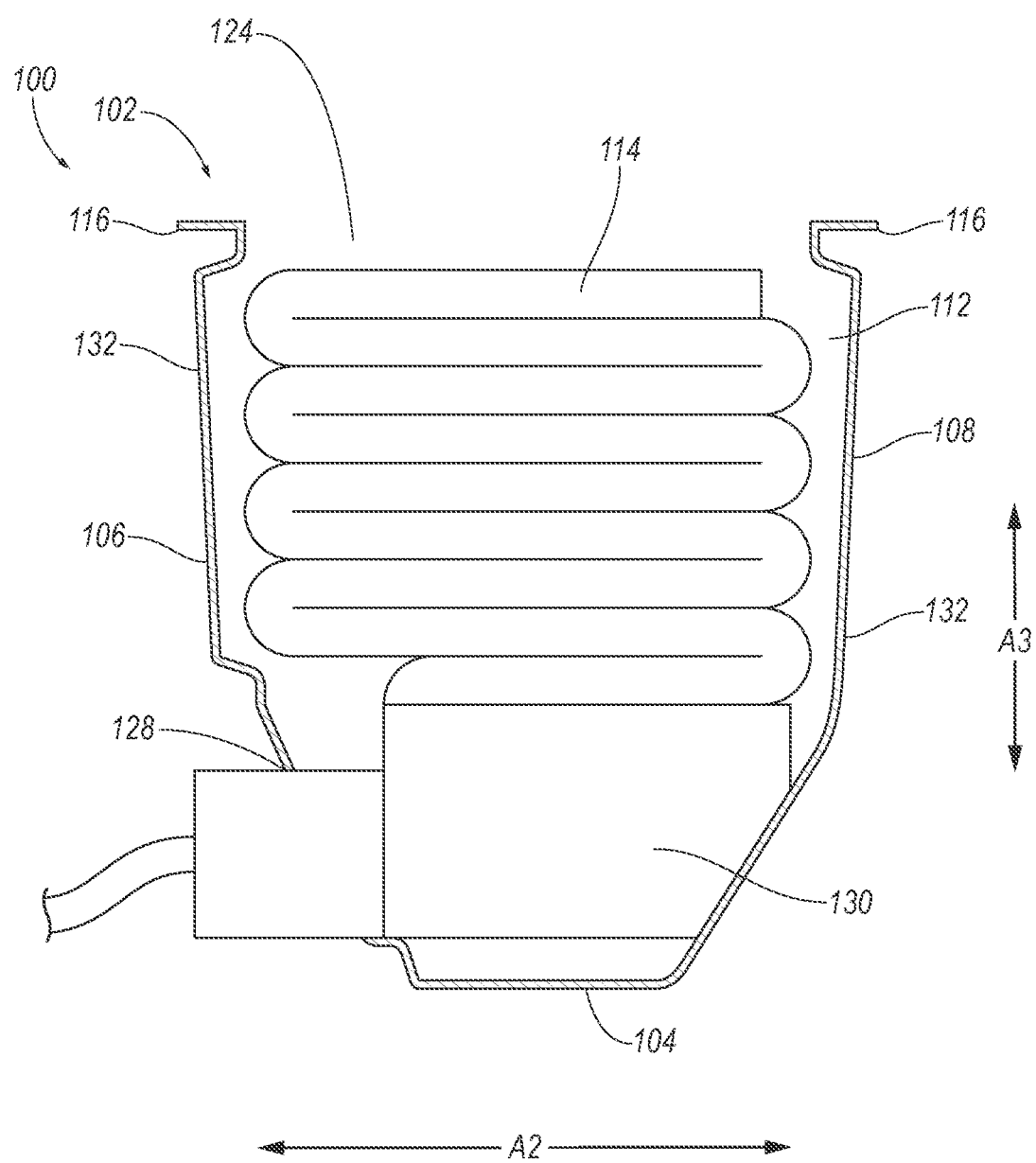
FIG. 5 is a cross-sectional view of the airbag assembly in an uninflated position.

The airbag 114 in the uniflated position is disposed in the cavity 112, as shown in FIGS. 1 and 5. For example, the airbag 114 in the uniflated position may be between the first wall 106 and the second wall 108 along the lateral axis A2, between the end walls 110 along the longitudinal axis A1, and between the base 104 and the open top 124 along the vertical axis A3.

Figure 6:
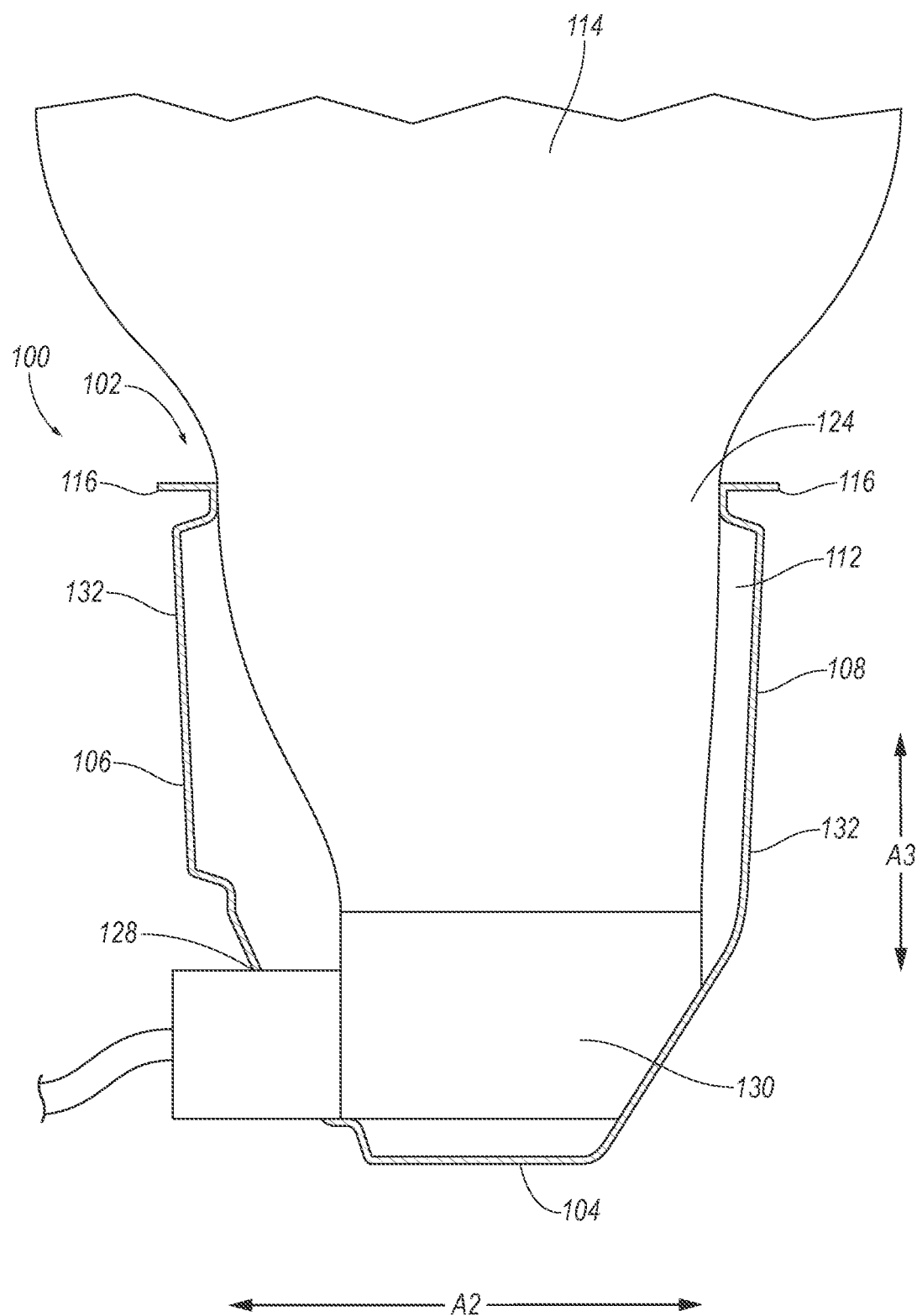
FIG. 6 is a cross-sectional view of the airbag assembly in an inflated position.

The airbag 114 in the inflated position extends out of the cavity 112 through the open top 124, e.g., along the vertical axis A3 and as shown in FIG. 6. In other words, the airbag 114 in the inflated position is outside the cavity 112, e.g., with the open top 124 between the airbag 114 and the housing 102.

The inflator 130 is in fluid communication with the airbag 114. The inflator 130 expands the airbag 114 with inflation medium, such as a gas, to move the airbag 114 from the uninflated position to the inflated position. The inflator 130 may be supported by any suitable component. For example, the inflator 130 may be supported by the housing 102. The inflator 130 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 130 may be, for example, at least partially in the inflation chamber to deliver inflation medium directly to the inflation chamber or may be connected to the inflation chamber through fill tubes, diffusers, etc. The inflator 130 may inflate the airbag 114 in response to receiving a command from a computer, e.g., transmitted upon an impact to the vehicle and detected with an impact sensor.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An airbag assembly, comprising:
a housing having a base, a first wall, a second wall, and a pair of end walls defining a cavity;
the first wall and the second wall spaced from each other, each of the first wall and the second wall extending from the base to a distal edge, the first wall defining an opening between the base and the distal edge of the first wall;
the pair of end walls spaced from each other and extending from the first wall to the second wall; the distal edge of the first wall extending from the end walls toward the second wall;
the housing having a support rib extending along the base to the opening and from the opening to the distal edge of the first wall; and
an airbag disposed in the cavity.

2. The airbag assembly of claim 1, wherein the first wall at the base extends toward the second wall from the end walls.

3. The airbag assembly of claim 1, wherein the distal edge of the second wall extends from the end walls toward the first wall.

4. The airbag assembly of claim 1, wherein the first wall is concave toward the cavity.

5. The airbag assembly of claim 4, wherein the second wall is concave toward the cavity.

6. The airbag assembly of claim 4, wherein the first wall defines an apex.

7. The airbag assembly of claim 6, wherein the apex is centered between the end walls.

8. The airbag assembly of claim 7, wherein the first wall includes a second support rib, the second support rib extending from the base to the distal edge of the first wall at the apex.

9. The airbag of claim 1, wherein a thickness of the first wall at the support rib is the same as a thickness of the first wall adjacent the support rib.

10. The airbag assembly of claim 1, wherein the end walls extend from the base to distal edges, and the distal edges of the end walls extend away from each other at the first wall and the second wall.

11. The airbag assembly of claim 1, wherein the end walls are convex away from the cavity.

12. The airbag assembly of claim 11, wherein the end walls each define an apex centered between the first wall and the second wall.

13. The airbag assembly of claim 1, wherein a distance from the first wall to the second wall is less at a center between the end walls than a distance from the first wall to the second wall at the end walls.

14. The airbag assembly of claim 1, wherein a distance between the end walls is greater at a center between the first wall and the second wall than a distance between the end walls at the first wall and the second wall.

15. The airbag assembly of claim 1, wherein the cavity has an open top at the distal edges, and the airbag in an inflated position extends out of the cavity through the open top.

* * * * *